Feb. 21, 1956 K. M. GAVER 2,735,821
TREATING STARCHES WITH ALKYL ARYLSULFONATES
Filed July 8, 1952

*INVENTOR.*
KENNETH M. GAVER
BY
Jerome R. Cox
ATTORNEY

United States Patent Office 2,735,821
Patented Feb. 21, 1956

2,735,821

TREATING STARCHES WITH ALKYLARYL SULFONATES

Kenneth M. Gaver, Columbus, Ohio, assignor to The Keever Starch Company, Columbus, Ohio, a corporation of Ohio Application July 8, 1952, Serial No. 297,741

4 Claims. (Cl. 252—188.3)

This application is in part a continuation of my copending application Serial No. 147,663, filed March 4, 1950, now abandoned. It discloses methods of preventing the retrogradation of starch and starch derivatives used in laundry, dry cleaning and finishing, and methods of preventing the crystallization of soluble starch and such derivatives when in dried films. It also discloses new compositions of matter. Inasmuch as my invention is also applicable to such starch derivatives as are used in laundry, dry cleaning and finishing, where I use starch or starches hereafter in this specification, I intend to apply the statements also to such starch derivatives.

It is well known that native starch is dispersible in hot water but is not soluble or dispersible in cold water. It is also known that both native starch and thin boiling starches (as, for example, a starch of 60 fluidity) and the so-called soluble starches, will retrograde as they dry so that they become no longer dispersible even in hot water, this disadvantage being a characteristic of starches such as that illustrated in Fig. 1. This same characteristic is true of the cooled, cooked pastes formed from the usual starches. The phenomena of retrogradation becomes much more pronounced as we progress from the native starches toward the dextrins. Therefore, a non-retrograding characteristic of starches and dextrins is even more valuable for starches and dextrins as we progress toward the dextrins.

Soluble starches are formed in various ways. When starch is mixed with cold water, in which it is insoluble, and is heated above the gelatinization temperature, it forms a paste which sets to a firm gel on cooling and standing. This paste is not again soluble or dispersible even in hot water. When native starch is treated with dilute acid and then heated with water, the granules are fractured and the starch micro-molecules or micelles disintegrate to a greater or lesser extent giving a thin boiling starch. If the acid treatment is continued long enough or vigorously enough, the process of treating with acid will give a so-called soluble starch. Other forms of "soluble" starch are produced by heating with dilute alkali or by treating with oxidizing agents. When starch is hydrolyzed, the larger molecules break down into somewhat smaller and simpler ones. First, dextrins are formed, their compositions and properties depending on the stage of hydrolysis. Dextrins in turn break down into maltose and maltose breaks down into glucose. This progressive hydrolysis with water is brought about slowly by boiling and more rapidly by treatment in the presence of added dilute acid or enzymes.

It is usually understood that starch is made up of two types of units, one of which is a branched type unit and the other of which is essentially a linear chain. As a cooked starch paste dries or freezes these units tend to align themselves, it being probable that the linear fractions line up more readily than the branched chain ones do. The linear fractions are presumably in the form of coils and probably the ends of branched chain fractions are also coils. This process forms areas of crystallinity, and is substantially the same as crystallization in other substances. With starch, it is called retrogradation. As stated above, the retrograded starch becomes insoluble and non-dispersible in water even with boiling. The retrogradation occurs as the free water is reduced, it not being necessary to reduce the water of hydration for retrogradation to occur. Apparently, both types of starch units are not equally soluble prior to retrogradation. It is probable, moreover, that both types do not become equally insoluble on retrogradation. However, certain units become insoluble with time and cannot thereafter be simply dissolved in water or dispersed therein. It is believed that the linear chain units are more subject to retrogradation than are the branched chain units. After retrogradation, the starch may be treated with alkali or other chemicals and thus dissolved or dispersed.

In the weaving of threads into cloth, a sizing is usually added for purpose of coating and protecting the threads during the process. After the weaving is completed, the sizing should usually be removed. Thus, in textile weaving the threads are often coated and impregnated with a starch paste which protects the thread during the weaving. In the sizing of textiles it is thus desirable that the sizing dry before the weaving in order to protect the threads but that it remain soluble so that it may be more readily removed after the weaving operation is completed and the sizing is no longer necessary. Most starch sizes, as pointed out above, dry prior to the weaving process and retrograde as they dry. Thus, they do not remain soluble and difficulty is encountered in their removal from the finished cloth. Native starches and retrograded starches may be hydrolyzed by heating in the presence of mineral acid catalysts or by enzymes such as malt amylases. However, the use of acid catalysts and enzymes and the usual practices in such uses are harmful to the cloth. That is to say, after the textile is woven, there is difficulty in removing the retrograded starch without substantial damage to the cloth.

For example, according to one practice which is usual, at the present time, the starch is removed by the use of enzymes which change the starch to soluble starches and/or dextrins. In this enzyme process the cloth is soaked in an enzyme solution and is allowed to stand wet for up to two or three days. Then the starch may be removed by washing. However, textiles lose in tensile strength during the enzyme treatment and especially during the period when the cloth is standing wet. This would suggest that the starch should be tydrolyzed by an acid process, because it is claimed that the acid treatment causes loss in tensile strength to a lesser degree than the loss caused by the enzyme treatment. However, the acid treatment has to be very strictly controlled or it will cause worse damage even than the enzyme treatment. For that reason, acid hydrolysis is used less than is the enzyme treatment.

Another use of starch sizes is to give to a finished fabric a better appearance and to hold the yardage thereof. Also, starch is often added as a finishing agent and in laundrying. In such uses, it is desirable and perhaps essential that the starch may be later removed from the fabric.

One of the objects of my invention is the production of starch complexes having improved qualities over native starch especially in respect to the elimination or at least the minimizing of retrogradation.

A further object of my invention is the provision of a process for producing a non-retrograding starch complex.

A further object of my invention is the provision of a process for preventing the retrogradation of starches and dextrins when in dried films.

A further object of my invention is the provision of a modified starch or dextrin in which there is complexed with the starch or dextrin, an agent having an intermediate block and two chains, one chain being such that it will enter within and attach itself to the spiral of a starch unit, and the other chain extending outward and having fatty characteristics and the block being of sufficient size to prevent its complete entry into the starch spiral.

A further object of the invention is the provision of a process for the complexing of starches and dextrins so that they will gelatinize in water on heating at lower temperatures and will reach the maximum swell thereof at a lower temperature and in a shorter time than corresponding starches and dextrins which have not been complexed in accordance with my invention.

A further object of the invention is the provision of a process for the complexing of starch and dextrins in which the granules will fragmentize at a much greater rate and more completely than in the corresponding starches and dextrins which have not been complexed in accordance with my invention.

A further object of the invention is the provision of a process for complexing starches and dextrins so that a cooled, cooked mixture thereof is wholly dispersible and/or much more readily dispersible in water (whether hot or cold) than a cooled, cooked mixture of the corresponding starches and dextrins which have not been complexed in accordance with my invention.

A further object of the invention is the provision of a process for complexing starches and dextrins in which the dried, cooked mixture thereof in film form is wholly dispersible and/or much more readily dispersible in warm or hot or cold water than corresponding film form mixtures of starches and/or dextrins which have not been complexed in accordance with my invention.

A further object of the invention is the provision of a process for complexing starches and/or dextrins in which (1) the percentage of increase of the soluble portion from the native starches to the dextrins is at a much more rapid rate than in starches and dextrins which have not been complexed in accordance with my invention; (2) the decrease in the gross fragment volume in the cook from the native starches to the dextrins is eliminated and/or reversed; and (3) the density of the fragment portion is decreased at a much more rapid rate than in all known starches and dextrins which have not been complexed according to my process.

A further object of the invention is the provision of a process for the modification of starches and dextrins in which the fragments are much more highly hydrated than in starches and dextrins which have not been complexed in accordance with my invention.

A further object is the provision of a starch having increased enzymatic susceptibility over all known starches not complexed according to my discoveries. Thus, it appears possible to de-size finished textile fabrics either without any enzyme or acid treatment or with a small quantity of enzymes or by using an enzyme treatment for a shorter time with a consequent saving in cost and the consequent production of better quality fabrics than otherwise is commercially possible.

A further object of the invention is a provision of products formed from starches and dextrins by complexing them, which products will gelatinize at lower temperatures and in shorter times; which will fragmentize into granules at a much greater rate; which will form very soft gels which are wholly dispersible in water (either hot or cold) or will not form gels at all; of which a dried, cooked mixture in film form is dispersible in warm or hot or cold water; in which the soluble portion increases percentagewise from the native starches to the dextrins at a more rapid rate, the gross fragment volume decreases from the native starches to the dextrins at a more rapid rate, and the number of fragments in the fragmentary portion decreases percentagewise; in which the fragments are much more highly hydrated; and in which the process of retrogradation is impeded and/or eliminated, as compared with starches and dextrins which have not been complexed in accordance with my invention.

One of the features of my invention is that the pastes which are formed from cooled or dried cooked mixtures of modified starch products, complexed by my process, are much clearer than the pastes which are formed from corresponding starch and dextrin products which have not been complexed in accordance with my invention.

Further objects and features of the invention will be apparent from the subjoined specification and claims when considered in connection with the accompanying drawings illustrating theories relating to my invention.

Figure 5:
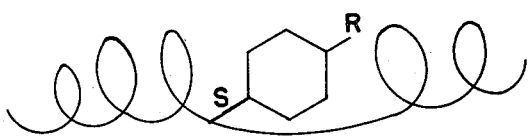
Fig. 5 is a diagram illustrating the theoretical shape of a modified starch unit after it has been gelatinized and then cooled and in which the electrical charges have all been neutralized.

It may be that instead of being neutralized, after gelatinization and cooling, the charges are merely disorganized. I am convinced that the attempt at recoiling will be even less successful in most cases than is shown in the diagram of Fig. 5.

I have discovered a method by which starches may be complexed with certain substances and I have discovered that starches so complexed form permanently soluble starches and soluble gels. These soluble starches and soluble gels will not crystallize as they are drying into films.

Thus I have found that there are certain substances which will prevent retrogradation of the starch without apparently changing the chemical structure thereof. My theory of the action of these substances is suggested above. More completely it is as follows: The substances used are substances which theoretically have a long chain with a block intermediate the ends of the chain, one end of the chain being of sufficient length so that it will enter into the spiral of the starch providing there a functional group which is attracted to the starch unit and the other end of the chain having a fatty character. In other words, the substance which is complexed with the starch should consist of the plug and two tails, one of the tails being the engaging tail which enters into the spiral of the starch and the other tail extending outwardly. The plug or block may, and usually does, consist of a group having a diameter of at least 7.2 Angstroms (7.2 A.) which is sufficiently large to prevent the plug from entering into the starch spiral. The total overall length of the long chain molecule including the plug and the two tails should correspond to the length of a carbon chain consisting of at least 16 carbon atoms. Preferably the outwardly extending tail should be a fatty tail for the purpose of providing lubrication in weaving and sizing operations. The complex formed by the combination of the starch with the complexing agent should be relatively easily dispersible. I have found that dispersibility is greatly influenced by the outwardly extending tail and the dispersibility of the complexed starch usually increases as the length of the outer tail increases from $C_{10}$ through $C_{12}$, $C_{14}$, $C_{16}$, to $C_{18}$ and above. Certain benefits may be derived if the outwardly extending tail ($C_{10}$, $C_{12}$—$C_{18}$, etc.) has some hydrophilic properties (as, for example, the hydrophilic properties of dihydroxy stearyl derivatives). However, there is a limit to the degree of hydrophilic characteristics which may be given to the outwardly extending tail inasmuch as excess hydrophilic characteristics will (1) detract from the bonding of the inwardly extending tail and (2) create a structure which appears as if both the inwardly and outwardly extending tails are attaching themselves to adjacent starch molecules.

The substances which I have discovered which are satisfactory for complexing with starch, are aryalkyl sulfonates such as decyl benzene sodium sulfonate, dodecyl benzene sodium sulfonate, tetradecyl benzene sodium sulfonate, hexadecyl benzene sodium sulfonate, octadecyl benzene sodium sulfonate, eicosyl benzene sodium sulfonate, and docosyl benzene sodium sulfonate.

Any type of block is satisfactory, but the outwardly extending tail R should have a carbon chain of 10 carbons or more (preferably having 16 carbons or more) and preferably the tail R should be saturated. Generally, other things being equal, the block should be greater than 7.2 A. in diameter. Some of the compounds listed above are much better than others as complexing agents. The octadecyl benzene sodium sulfonate is one of the most satisfactory which I have discovered.

I will again point out my theories to account for the change in the starch structure by which these improvements are accomplished with specific reference to the drawings.

Figure 1:
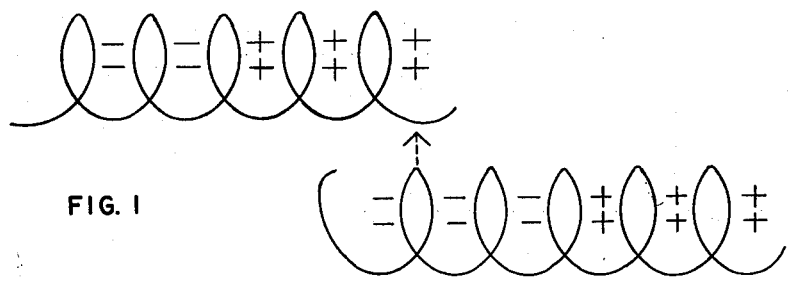
Fig. 1 is a diagram illustrating the theoretical shape of a pair of starch units which have not been complexed in accordance with my invention and which are undergoing retrogradation.

Referring to Fig. 1, it may be seen that I have shown two coils to illustrate two units of starch which are in the coiled form (i. e., the unbranched type of starch). It will be seen that these coiled units are illustrated as having negative areas and positive areas. The negative area of one would naturally be attracted to the positive area of another with a result that areas of crystallinity would be formed (i. e. retrogradation).

Figure 2:
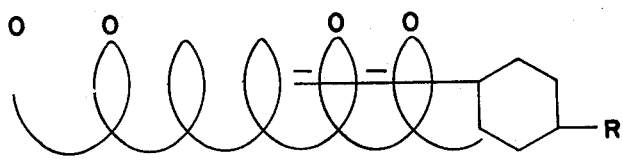
Fig. 2 is a drawing illustrating diagrammatically the theoretical form of one type of complexed starch unit.

In Fig. 2 I have shown a unit of starch as modified according to my invention. Therein the charges on the unit of starch are neutralized (at least in part) or the charge distribution is distorted along the molecule, thus dispersing or eliminating the attractive forces causing crystallinity. All of the compounds claimed herein are strongly hydrogen bonding at one of the starch hydroxyls. This is the phenomenon which I have called complexing herein both above and below.

Figure 3:
Fig. 3 is a diagram illustrating the shape on gelatinization of a starch unit which has not been complexed in accordance with my invention.
Figure 4:
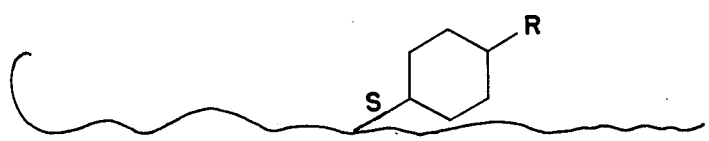
Fig. 4 is a diagram illustrating the shape on gelatinization of a starch unit which has been complexed in accordance with my invention together with the anti-retrograding material conjoined thereto.

On the other hand, the change may be mechanical rather than physical. One of the coils as shown in Fig. 1 may uncoil or gelatinization to give a structure to that shown in Fig. 3 with no clear cut charge distribution. However, when the structure of Fig. 2 uncoils, the added chemical remains attached as shown in Fig. 4 (if it previously was attached) or at that time becomes similarly attached by hydrogen bonding. If the molecule tries to recoil to attain the form shown in Fig. 2, is unable to do so and instead gives an irregular spiral such as that shown in Fig. 5 in which the charges are eliminated, it being understood that instead of total elimination, the charge distribution may be irregular and distorted and thus also prevents the orderly arrangement required for crystallization. The recoiling will also probably be even less symmetrical than is shown.

Chemical addition may be involved in my new process and it is believed to be illustrated by the following equation, it being understood that each starch chain ends in an aldehyde group as shown in the first term of the equation:

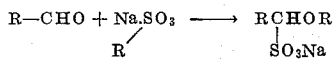

The above shows the addition product as a sodium sulfonate. Thus the possible chemical change appears to be an addition process wherein the maximum effect is accomplished with approximately molar equivalents.

A comparison of starches and dextrins with one type of the complexed products thereof as to various characteristics is set out in the following tables.

TABLE I

*Scott viscosities*

All starch samples tested were corrected to 12% moisture content and the ounces required to give a 45 Scott are as follows:

|  | Oz. Pure Starch | Oz. Complexed product |
| --- | --- | --- |
| Pearl | 4.88 | 4.90 |
| 40F | 8.05 | 8.23 |
| 60F | 9.80 | 10.46 |
| 75F | 14.20 | 14.51 |
| 80F | 11.65 | 12.09 |
| 82F | 12.90 | 14.01 |
| 87F | 18.20 | 18.42 |

In general, complexed starches cook at a slightly lower Scott viscosity than the parent starch but not significantly so.

TABLE II

*Initial swell temperature*

The temperature at which a perceptible rise in viscosity was noted taken as the initial swell temperature. This roughly corresponds to the gelatinization temperature.

|  | Pure Starch, °F. | Complexed product, °F. |
| --- | --- | --- |
| Pearl Corn | 173 | 158 |
| 40F | 170 | 164 |
| 60F | 168 | 167 |
| 75F | 161 | 160 |
| 80F | 166 | 157 |
| 82F | 152 | 152 |
| 87F | 145 | 150 |

In general, complexed starches gelatinize at lower temperatures than the pure starches. The 75F is a mixture of thick and thin starches and behaves as a thin starch in this property. Note the deviation of the very thin starches.

TABLE III

*Temperature of maximum swell*

The temperature at which the viscosity attains a maximum was recorded as the maximum swell.

|  | Pure Starch, °F. | Complexed product, °F. |
| --- | --- | --- |
| Pearl | 185 | 173 |
| 40F | 184 | 173 |
| 60F | 183 | 173 |
| 75F | 181 | 170 |
| 80F | 178 | 168 |
| 82F | 175 | 172 |
| 87F | 167 | 161 |

Complexed starches tend to completely gelatinize at a lower temperature than the original starches.

TABLE IV

*Fragment settling*

The fragment settling is inversely proportional to fragment size and density. The table below shows the volume (expressed milliliters) occupied by the settled fragments from 1000 cc. of 2% solution.

|  | Pure Starch, milliliters | Complexed product, milliliters |
|---|---|---|
| Pearl | 745 | 960 |
| 40F | 780 | 975 |
| 60F | 860 | 975 |
| 75F | 890 | 990 |
| 80F | 890 | 980 |
| 82F | 880 | 980 |
| 87F | 840 | 980 |

Complexed starches contain more highly stabilized fragments or perhaps are more highly swollen. At least they occupy a larger volume of the cook.

TABLE V

*Fragment volume*

Portions of the 2% dilution were centrifuged to determine approximate fragment volume and density. The percentages below are percentages of total volume.

|  | Pure Starch, percent | Complexed product, percent |
|---|---|---|
| Pearl | 52.50 | 90.00 |
| 40F | 44.00 | 97.50 |
| 60F | 43.00 | 97.50 |
| 75F | 33.00 | 99.00 |
| 80F | 36.00 | 98.00 |
| 82F | 34.00 | 98.00 |
| 87F | 30.00 | 98.00 |

Fragments of complexed starches are more highly hydrated and voluminous than pure starches.

TABLE VI

*Fragment density*

This table shows the density or specific gravity calculated from the fragment volume and its weight.

|  | Pure starch | Complexed product |
|---|---|---|
| Pearl | 1.0303 | 1.0049 |
| 40F | 1.0097 | 1.0037 |
| 60F | 1.0092 | 1.0030 |
| 75F | 1.0109 | 1.0022 |
| 80F | 1.0087 | 1.0024 |
| 82F | 1.0083 | 1.0018 |
| 87F | 1.0073 | 1.0013 |

Complexed starches in general are less dense than pure starches.

TABLE VII

*Solubles*

Solubles (that portion filtering through a Whatman #1 filter paper) were determined on the 2% dilution and the following table shows the percent of the entire material which is soluble.

|  | Pure starch, percent | Complexed starch, percent |
|---|---|---|
| Pearl | 21.95 | 33.50 |
| 40F | 35.41 | 43.30 |
| 60F | 39.75 | 61.70 |
| 75F | 45.35 | 66.80 |
| 80F | 48.30 | 70.25 |
| 82F | 53.75 | 72.25 |
| 87F | 65.80 | 74.40 |

Complexed pastes are more soluble in water than pure starches.

TABLE VIII

*Film solubility*

The solubility of the dried film in water was determined by digesting weighed pieces in boiling distilled water for 2 hours and determining the solids in the filtrate in terms of percent of the total film.

|  | Pure starch, percent | Complexed product, percent |
|---|---|---|
| Pearl | 10.42 | 24.33 |
| 40F | 17.51 | 32.17 |
| 60F | 21.12 | 36.70 |
| 75F | 31.65 | 42.25 |
| 80F | 33.55 | 45.45 |
| 82F | 40.25 | 55.26 |
| 87F | 49.25 | 58.10 |

Complexed starches are more soluble than pure starches.

TABLE IX

*Enzymatic susceptibility*

Pieces of film were digested in 0.001% buffered enzyme solution for 2 hours and the solubles determined on the filtrate. The following table shows the percent of soluble material.

|  | Pure starch, percent | Complexed product, percent |
|---|---|---|
| Pearl | 27.44 | 33.99 |
| 40F | 30.43 | 51.68 |
| 60F | 31.43 | 56.25 |
| 75F | 46.51 | 65.35 |
| 80F | 35.69 | 57.75 |
| 82F | 44.02 | 58.52 |
| 87F | 50.29 | 59.69 |

Complexed starches are more susceptible to enzyme action than are pure starches.

TABLE X

*Fragment diameter*

The average diameter of the visible particles were measured on a ruled slide. The table shows the diameters of the average visible particles in microns.

|  | Pure starch | Complexed product |
|---|---|---|
| Pearl | 10.14 | 6.76 |
| 40F | 7.64 | 9.50 |
| 60F | 7.00 | 13.60 |
| 75F | 6.40 | 4.70 |
| 80F | 5.60 | 4.70 |
| 82F | 4.80 | 4.70 |
| 87F | 4.55 | 4.70 |

TABLE XI

*Fragment number*

The number of visible fragments were counted in each 0.10 cu. mm. The table shows the number in each case.

|  | Pure starch | Complexed product |
|---|---|---|
| Pearl | 9 | 19 |
| 40F | 7 | 14 |
| 60F | 7 | 7 |
| 75F | 15 | 16 |
| 80F | 14 | 64 |
| 82F | 14 | 42 |
| 87F | 14 | 36 |

The fields were much more diffuse and difficult to count but it appeared that there were many more particles in complexed starches.

Evaluation of the above tables follows:

Native and thin boiling starches and dextrins (whether branched or unbranched) are not dispersible in cold water but are partially dispersible in warm water. The native and thin boiling starches and the dextrins when modified with my anti-crystallization or complexing agents are also not dispersible in cold water and are also partially dispersible in warm water being much more completely dispersible, however, in warm water than the uncomplexed starches and dextrins. The native and thin boiling starches and the dextrins will gelatinize in water on heating. The change in structural viscosity appears to be derived from an apparent swollen granular structure. The complexed starches and dextrins will also gelatinize in water on heating, but at a lower temperature and in a shorter time, the difference being greater with native starches and less with dextrins. Native and thin boiling starches and dextrins when gelatinized fragmentize by reason of disorganization of the granular structure so that the apparent viscosity approaches the laminar or true viscosity. When such native or thin boiling starches and dextrins are complexed by my anti-crystalline or complexing agent there is also a disorganization of the granular structure and when the products are gelatinized, they fragmentize, but at a much greater rate than starches and dextrins which have not been so complexed.

After a cooked mixture of native starches or dextrins is cooled it will congeal to a very firm gel which is not dispersible in water, hot or cold. Where starches or dextrins are complexed by commercial (i. e. economically limited) quantities of my complexing or non-retrograding agents and when the products are cooked and cooled, they will form a very soft gel which is dispersible in water, either hot or cold. If larger amounts (i. e. approaching molar quantities) of the complexing or anti-crystalline agent are used, there will be no gel formed at all. If the cooked mixture of starches or dextrins is dried in film form it is not dispersible in water, hot or cold. However, if a starch or a dextrin is complexed by the use of reasonable commercial amounts of one of my complexing or anti-crystalline agents, the dried film will be dispersible in warm or hot water and if larger amounts of my complexing agent are used, the film will be completely dispersible in cold water.

In a cooked batch of a starch or dextrin, the soluble portion increases percentagewise from the native starches toward the dextrins and if the starches and dextrins are complexed according to my process, there is a similar increase, but at a much greater rate. In cooked batches of starches and dextrins which have not been complexed in accordance with my invention, the gross fragment volume decreases from the native starch toward the dextrins but in my complexed starches and dextrins, there is no decrease from the native starch towards the dextrins but actually an increase. In cooked batches of complexed starches and dextrins, the density of the fragmentary portion decreases at a much more rapid rate than in starches and dextrins which have not been complexed in accordance with my invention. However, being used in increasing concentration with the increase in the fluidity, more particles are introduced. In cooked batches of starches and dextrins, there is a certain amount of fragment hydration but in the complexed starches and dextrins the fragments are much more highly hydrated. For instance, the fragments are hydrated up to twice as much as in the corresponding starch or dextrin, which has not been complexed.

Referring still to my comparison of the characteristics of native and thin boiling starches and dextrins which have not been complexed to such starches and dextrins which have been complexed, it may be pointed out that the starches and dextrins after retrogradation form a paste which is very cloudy whereas my complexed starches and dextrins form a paste which is much clearer.

The phenomenon of retrogradation which consists of the formation of areas of crystallinity within or across dispersed starch or dextrin molecules and/or fragments is apparent in all unmodified starches and dextrins. However, in my complexed starches and dextrins, the process of retrogradation is impeded and if the addition of the anti-crystalline agent is large enough, the phenomenon is entirely eliminated. Anti-crystalline agents are preferred in which the outwardly extending tail is rather long. For this purpose a structure having sixteen carbon atoms is better than one having fourteen carbon atoms and a $C_{18}$ structure is better than a $C_{16}$. A saturated structure is better than an unsaturated structure unless the latter structure is first hydroxylated. The above statements while generally true, are to some extend modified by the type of the block and/or the structure of the other end of the complexing agent. In Fig. 4 above the outwardly extending tail is designated by the letter R. In such case, R may be $C_{10}$, $C_{12}$, $C_{14}$, $C_{16}$, $C_{18}$, $C_{20}$, $C_{22}$ or higher. The inner tail is designated by the letter S. The complexing compound may as stated above, be an aralkyl sulfate or an aralkyl sulfonate (such as, for example, an octadecyl benzene sodium sulfonate), or other bonding materials of similar molecular shape and features.

I have found that the complexing of starch with all of the compounds mentioned above improve greatly its qualities for use as a sizing. Especially I have found that the octadecyl benzene sodium sulfonate when so complexed with starch is very beneficial. For example, starches treated with octadecyl benzene sodium sulfonate in quantities of from 0.25% to 5.0% and up are superior in following qualities: (1) The starch is stable because of the treatment; (2) the starch is uniform because of the treatment; (3) the starch mixes with water more easily; (4) the starch is easier to cook; (5) the starch cooks in shorter time and cooks more completely; (6) the starch is more compatible with adjuncts; (7) it has less congealing characteristics; and most important (8) it has less tendency to retrograde.

Upon application of starches treated with octadecyl benzene sodium sulfonate to warped yarns, I find that the sizing has a superior wetting characteristic, superior penetration, superior coating characteristics and superior size pick-up is possible; the yarns are easier drying, have superior fiber lay and increased tensile strength; the size has superior filmability, a more elastic film, a greater adhesiveness, more lubricity on the yarn, a smoother film, greater abrasive resistance, less susceptibility to humidity, greater film clarity, greater enzymatic susceptibility and is more easily removed in desizing processes of any type.

After weaving into cloth, I find that with a size made up of starch treated with octadecyl benzene sodium sulfonate, the cloth has a superior hand or feel, more weight is added, there is easier wetting, easier desizing, better appearance, more uniformity, and superior resiliency. The practical limits of the percentage of the octadecyl benzene sodium sulfonate are from 0.5% up to 1.0% of the starch. More of the octadecyl benzene sodium sulfonate would make the starch more soluble but the percentages mentioned of 0.5% to 1.0% are economically more practical. I found that the addition of 1% of the complexing agent to an 80 fluidity starch increased the solubles contained therein from 54 to 72% and with an 87 fluidity starch increased the solubles from 66 to 75%. The percentages given above are percentages of that portion of the starch which is dissolved. The insoluble residue is deposited on the warp yarn as a discontinuous network of starch size which may be readily removed by mechanical means. The addition of the complexing agent maintains the viscosity of the starch at the same time that it increases the solubility.

Following are examples of the practice of my invention:

EXAMPLE I

I mixed an 82 fluidity corn starch with ½ of 1% of octadecyl benzene sodium sulfonate and found that the number of ounces of 12% moisture starch required to equal a 45 second Scott test increased from 12.90 to approximately 14.0, the initial swell temperature increased, the maximum swell temperature decreased, the maximum viscosity increased, the final viscosity decreased markably, the gel changed from a hard to a soft gel, the gel dispersibility increased from 0% to 100%, the film became somewhat brittle, its solubility in water increased, the enzymatic susceptibility increased, the dilution settle decreased, the amount of soluble solids increased, the acidity measured in pH remained constant, the fragment volume increased, the number of fragments per unit volume increased, the density decreased, the diameter of particles decreased, the alkali lability remained substantially constant, the reciprocal of the viscosity as measured by the tip test increased, the size of the particles viewed under the microscope decreased, the amount of swell remained substantially at the maximum, the rupture of particles was complete and the ratio of percentage of starch insolubles over starch solubles decreased. The complexed starch was then used in the weaving of textiles. It showed superior loom efficiency during the several weeks that it was used, it desized readily with hot water to below 1% of size in the woven cloth and enzyme de-sizing was not necessary as at least 80 to 90% of the size was removed by water and substantially all of the remainder by shaking of the cloth. Throughout the time the loom efficiency was equal or superior to the loom efficiency of adjacent looms.

EXAMPLE II

I mixed an 87 fluidity corn starch with ½ of 1% of octadecyl benzene sodium sulfonate and found that the number of ounces of 12% moisture starch required to equal a 45 second Scott test increased from 18.2 to approximately 18.4, the initial swell temperature increased, the maximum swell temperature decreased, the maximum viscosity increased, the final viscosity decreased markably, the gel changed from a hard to a soft gel, the gel dispersibility increased from 0% to 100%, the film became somewhat brittle, its solubility in water increased, the enzymatic susceptibility increased, the dilution settle decreased, the amount of soluble solids increased, the acidity measured in pH remained constant, the fragment volume increased, the number of fragments per unit volume increased, the density decreased, the diameter of particles decreased, the alkali lability remained substantially constant, the reciprocal of the viscosity as measured by the tip test increased, the size of the particles viewed under the microscope decreased, the amount of swell remained substantially at the maximum, the rupture of particles was complete and the ratio of percentage of starch insolubles over starch solubles decreased. The complexed starch was then used in the weaving of textiles. It showed superior loom efficiency during the several weeks that it was used, it de-sized readily with hot water to below 1% of size in the woven cloth and enzyme de-sizing was not necessary as at least 80 to 90% of the size was removed by water and substantially all of the remainder by shaking of the cloth. Throughout the time the loom efficiency was equal or superior to the loom efficiency of adjacent looms.

EXAMPLE III

I mixed a 60 fluidity corn starch with ½ of 1% of octadecyl benzene sodium sulfonate and found that the number of ounces of 12% moisture starch required to equal a 45 second Scott test increased from 9.8 to approximately 10.5, the initial swell temperature increased, the maximum swell temperature decreased, the maximum viscosity increased, the final viscosity decreased markably, the gel changed from a hard to a soft gel, the gel dispersibility increased from 0% to 100%, the film became somewhat brittle, its solubility in water increased, the enzymatic susceptibility increased, the dilution settle decreased, the amount of soluble solids increased, the acidity measured in pH remained constant, the fragment volume increased, the number of fragments per unit volume increased, the density decreased, the diameter of particles decreased, the alkali lability remained substantially constant, the reciprocal of the viscosity as measured by the tip test increased, the size of the particles viewed under microscope decreased, the amount of swell remained substantially at the maximum, the rupture of particles was complete and the ratio of percentage of starch insolubles over starch solubles decreased. The complexed starch was then used in the weaving of textiles. It showed superior loom efficiency during the several weeks that it was used, it de-sized readily with hot water to below 1% of size in the woven cloth and enzyme de-sizing was not necessary as at least 80 to 90% of the size was removed by water and substantially all of the remainder by shaking of the cloth. Throughout the time the loom efficiency was equal or superior to the loom efficiency of adjacent looms.

EXAMPLE IV

I mixed a blend of an 82 fluidity corn starch and an 82 fluidity wheat starch with ½ of 1% of octadecyl benzene sodium sulfonate and found that the number of ounces of 12% moisture starch required to equal a 45 second Scott test increased from 12.90 to approximately 14.0, the initial swell temperature increased, the maximum swell temperature decreased, the maximum viscosity increased, the final viscosity decreased markably, the gel changed from a hard to a soft gel, the gel dispersibility increased from 0% to 100%, the film became somewhat brittle, its solubility in water increased, the enzymatic susceptibility increased, the dilution settle decreased, the amount of soluble solids increased, the acidity measured in pH remained constant, the fragment volume increased, the number of fragments per unit volume increased, the density decreased, the diameter of particles decreased, the alkali lability remained substantially constant, the reciprocal of the viscosity as measured by the tip test increased, the amount of swell remained substantially at the maximum, the rupture of particles was complete and the ratio of percentage of starch insolubles over starch solubles decreased. The complexed starch was then used in the weaving of textiles. It showed superior loom efficiency during the several weeks that it was used, it de-sized readily with hot water to below 1% of size in the woven cloth and enzyme de-sizing was not necessary as at least 80 to 90% of the size was removed by water and substantially all of the remainder by shaking of the cloth. Throughout the time the loom efficiency was equal or superior to the loom efficiency of adjacent looms.

EXAMPLE V

I mixed a blend of a 60 fluidity corn starch and a 60 fluidity wheat starch with ½ of 1% of octadecyl benzene sodium sulfonate and found that the number of ounces of 12% moisture starch required to equal a 45 second Scott test increased from 9.8 to approximately 10.5, the initial swell temperature increased, the maximum swell temperature decreased, the maximum viscocity increased, the final viscosity decreased markably, the gel changed from a hard to a soft gel, the gel dispersibility increased from 0% to 100%, the film became somewhat brittle, its solubility in water increased, the enzymatic susceptibility increased, the dilution settle decreased, the amount of soluble solids increased, the acidity measured in pH remained constant, the fragment volume increased, the number of fragments per unit volume increased, the density decreased, the diameter of particles decreased, the alkali lability remained substantially constant, the reciprocal of the viscosity as measured by the tip test increased, the size of the particles viewed under the microscope decreased, the amount of swell remained substantially at the maximum, the rupture of particles was complete and the ratio of percentage of starch insolubles over starch solubles decreased. The complexed starch was then used in the weaving of textiles. It showed superior loom efficiency during the several weeks that it was used, it de-sized readily with hot water to below 1% of size in the woven cloth and enzyme de-sizing was not necessary as at least 80 to 90% of the size was removed by water and substantially all of the remainder by shaking of the cloth. Throughout the time the loom efficiency was equal or superior to the loom efficiency of adjacent looms.

Following are tables showing in tabular form results of tests of the products of the above and of additional examples of my processes and products. In all of the tests on the complexed starches of such examples, the products were produced with the use of 1% of the complexing agent.

In these tables, the expression "oz. to 45 Scott, 12% moisture" gives the number of ounces required to show a 45 second Scott test where the starch had 12% moisture. The expression "CIRF conc. dry" is the index of Corn Industries Research Foundation, concentration dry. The "initial swell degree F." gives the temperature expressed in Fahrenheit at which the starch begins to swell when cooked and the "max. swell degrees F." gives the temperature at which the starch had its maximum swell when cooked. The maximum viscosity is expressed in gram-centimeter. The solubility in water is expressed in percent of starch which is soluble. Enzymatic susceptibility is expressed in percentage of starch in solution, as is the solubility in water. The dilution settle is the percentage of supernatant liquid on top of the settlement fragments in 1000 cc. of 2% solution. Soluble solids is expressed in percent. Fragment volume is expressed in percent of a 2% solution. Diameter is expressed in microns. Alkali lability is a measure of the ends of the molecule. Tip test is a reciprocal of the viscosity. Rupture "A" represents a condition in which each of the particles of starch is ruptured. "A+" in which each of the re-ruptured particles is itself re-ruptured, etc.

Tables XII, XIII, XIV and XV show the same characteristics of the same compounds as are listed in Tables I-XI in a different form and also include additional characteristics. These characteristics are usually expressed in the same units.

TABLE XII

| | Pearl | Complexed Pearl | 40F | Complexed 40F |
|---|---|---|---|---|
| Oz. to 45 Scott, 12% Moist. | 4.88 | 4.90 | 8.05 | 8.23. |
| CIRF Conc., Dry | 5.0 | 5.0 | 6.0 | 6.0. |
| Initial Swell, °F | 173 | 158 | 170 | 164. |
| Max. Swell, °F | 185 | 173 | 184 | 173. |
| Max. Viscosity, gm. cm | 160 | 189 | 157 | 168. |
| Final Viscosity, gm. cm | 154 | 130 | 132 | 52. |
| Gel | Hard | Soft | Hard | Soft. |
| Gel Dispersibility | 0 | 100% | 0 | 100%. |
| Film | Excel | Brittle | Excel | Brittle. |
| Solubility in Water, percent | 10.42 | 24.33 | 17.51 | 32.17. |
| Enzymatic Susceptibility, percent | 27.44 | 33.99 | 30.43 | 51.68. |
| Dilution Settle, ml | 255 | 40 | 220 | 25. |
| Soluble Solids, percent | 21.95 | 33.50 | 35.41 | 43.30. |
| pH | 7.00 | 6.80 | 6.90 | 6.90. |
| Fragment Volume, percent | 52.50 | 90.00 | 44.00 | 97.50. |
| No. per .10 cmm | 9 | 19 | 7 | 14. |
| Density | 1.0303 | 1.0049 | 1.0097 | 1.0037. |
| Diameter (microns) | 10.14 | 6.76 | 7.64 | 9.50. |
| Alkali Lability | 7.97 | 7.97 | 9.26 | 9.26. |
| Tip Test | 4.5 | 5.0 | 39.5 | 40.5. |
| Swell | Max. | Max. | Max. | Max. |
| Rupture | A | A+++ | A | A+++. |
| Ratio, Percent Coating fragments/percent penetrating fragments. | 3.56 | 1.99 | 1.77 | 1.31. |

TABLE XIII

| | 60F | Complexed 60F | 75F | Complexed 75F |
|---|---|---|---|---|
| Oz. to 45 Scott, 12% Moist. | 8.62 | 9.20 | 14.20 | 14.51. |
| CIRF Conc., Dry | 6.5% | 6.5% | 7.0F% | 7.0%. |
| Initial Swell, °F | 168 | 167 | 161 | 160. |
| Maximum Swell, °F | 183 | 173 | 181 | 170. |
| Max. Viscosity, gm. cm | 168 | over 225 | 168 | 200. |
| Final Viscosity, gm. cm | 138 | 43 | 73 | 23. |
| Gel | Hard | Soft | Hard | Soft. |
| Gel Dispersibility | 0 | 100 | 0 | 100. |
| Film | Excel | Brittle | Excel | Brittle. |
| Solubility in Water, percent | 21.12 | 56.70 | 31.65 | 42.25. |
| Enzymatic Susceptibility, percent | 31.43 | 56.25 | 46.51 | 65.35. |
| Dilution Settle, ml | 140 | 25 | 110 | 10. |
| Soluble Solids, percent | 39.75 | 61.70 | 45.35 | 66.80. |
| pH | 6.7 | 6.9 | 6.7 | 6.8. |
| Fragment Volume, percent | 43.00 | 97.50 | 33.00 | 99.00. |
| No. per 0.10 cmm. (visible) | 7 | 7 | 15 | 16. |
| Density | 1.0092 | 1.0030 | 1.0109 | 1.0022. |
| Diameter (microns) | 7.00 | 13.60 | 6.40 | 4.40. |
| Alkali Lability | 10.66 | 10.66 | 12.06 | 12.06. |
| Tip Test | 59 | 61 | 74.5 | 75.5. |
| Swell | Max. | Max. | Max. | Max. |
| Rupture | A | A+++ | A | A+++. |
| c/p | 1.27 | 0.62 | 1.20 | 0.52. |

TABLE XIV

| | 80F | Complexed 80F | 82F | Complexed 82F |
|---|---|---|---|---|
| Oz. to 55 Scott, 12% Moist. | 11.65 | 12.09 | 12.90 | 14.01. |
| CIRF Conc., Dry | 7.25 | 7.25 | 7.50 | 7.50. |
| Initial Swell, °F | 168 | 157 | 145 | 150. |
| Max. Swell, °F | 178 | 168 | 175 | 172. |
| Max. Viscosity, gm. cm. | 163 | 183 | 178 | 185. |
| Final Viscosity, gm. cm. | 75 | 10 | 83 | 25. |
| Gel | Hard | Soft | Hard | Soft. |
| Gel Dispersibility | 0 | 100 | 0 | 100. |
| Film | Excel | Brittle | Excel | Brittle. |
| Solubility in Water, Percent | 33.55 | 45.45 | 40.25 | 55.26. |
| Enzymatic Susceptibility, Percent | 35.67 | 57.75 | 44.02 | 58.52. |
| Dilution Settle, ml | 110 | 20 | 120 | 20. |
| Soluble Solids, Percent | 48.30 | 70.25 | 53.75 | 72.25. |
| pH | 6.9 | 6.8 | 6.6 | 6.6. |
| Fragment Volume, Percent | 36.00 | 98.00 | 34.00 | 98.00. |
| No. per 0.10 cmm | 14 | 64 | 14 | 42. |
| Density (microns) | 1.0087 | 1.0024 | 1.0083 | 1.0018. |
| Diameter | 5.60 | 4.70 | 4.80 | 4.70. |
| Alkali Lability | 12.06 | 12.06 | 13.79 | 13.79. |
| Tip Test | 79 | 80.5 | 80 | 82. |
| Swell | Max. | Max. | Max. | Max. |
| Rupture | A+ | Complete | A+ | Complete. |
| c/p | 0.95 | 0.25 | 0.94 | 0.39. |

TABLE XV

| | 87F | Complexed 87F |
|---|---|---|
| Oz. to 45 Scott, 12% Moist. | 18.20 | 18.42. |
| CIRF Conc., Dry | 9.0 | 9.0. |
| Initial Swell, °F | 145 | 150. |
| Max. Swell, °F | 167 | 161. |
| Max. Viscosity, gm. cm | 168 | 183. |
| Final Viscosity, gm. cm | 48 | 10. |
| Gel | Hard | Soft. |
| Gel Dispersibility | 0 | 100. |
| Film | Excel | Brittle. |
| Solubility in Water, Percent | 49.25 | 58.10. |
| Enzymatic Susceptibility, Percent | 50.29 | 59.69. |
| Dilution Settle, ml | 160 | 20. |
| Soluble Solids, Percent | 65.80 | 74.40. |
| pH | 6.6 | 6.8. |
| Fragment Volume, Percent | 30.00 | 98.00. |
| No. per 0.10 cmm | 14 | 36. |
| Density | 1.0073 | 1.0013. |
| Diameter (microns) | 4.55 | 4.70. |
| Alkali Lability | 14.43 | 14.43. |
| Tip Test | 82.5 | 83. |
| Swell | Max. | Max. |
| Rupture | A+ | A+++. |
| c/p | 0.52 | 0.40. |

My improved product, consisting of a complexed starch (whether native or thin boiling) and dextrins, has many uses but its most obvious uses are in the textile and laundry industries, as, for example, in preparing sizings for textiles and in finishing textiles and in preparing pastes and liquid starches for laundry purposes.

It is to be understood that the above described embodiments of my invention are for the purpose of illustration only and various changes may be made therein without departing from the spirit and scope of the following claims.

I claim:

1. A composition of matter comprising a mixture of starch with a complexing agent having a formula of

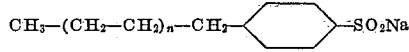

where $n$ is an integer of from 4 to 10 inclusive.

2. A process for treating starches which comprises mixing starch with a complexing agent having a formula of

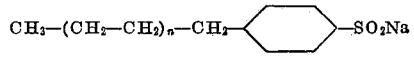

where $n$ is an integer of from 4 to 10 inclusive.

3. A composition of matter comprising a mixture of a starch with a complexing agent consisting of an octadecyl benzene sodium sulfonate which mixture on cooking will form a starch complex.

4. A process for treating starch which comprises mixing an octadecyl benzene sodium sulfonate with the starch.

References Cited in the file of this patent

UNITED STATES PATENTS

| | | |
|---|---|---|
| 984,330 | Weingartner | Feb. 14, 1911 |
| 2,028,189 | Bowlby | Jan. 21, 1936 |
| 2,039,279 | Bouhuys | May 5, 1936 |
| 2,210,962 | Thomas | Aug. 13, 1940 |
| 2,233,676 | Reed | Mar. 4, 1941 |
| 2,283,044 | Caesar | May 12, 1942 |
| 2,374,931 | Griffin | May 1, 1945 |